(12) United States Patent
Krauss et al.

(10) Patent No.: US 7,761,962 B2
(45) Date of Patent: Jul. 27, 2010

(54) HOSE CLAMP

(75) Inventors: Mathias Krauss, Nidderau (DE); Stephan Mann, Bieber (DE); Gunter Röder, Münden (DE); Ewald Krieger, Adenbüttel (DE)

(73) Assignee: Norma Germany GmbH, Maintal (DE)

( * ) Notice: Subject to any disclaimer, the term of this patent is extended or adjusted under 35 U.S.C. 154(b) by 36 days.

(21) Appl. No.: 11/974,167

(22) Filed: Oct. 10, 2007

(65) Prior Publication Data

US 2008/0098575 A1      May 1, 2008

(30) Foreign Application Priority Data

Oct. 12, 2006   (DE)   .................. 10 2006 048 336

(51) Int. Cl.
    *F16L 33/04*   (2006.01)
(52) U.S. Cl. ............................. 24/279; 24/19
(58) Field of Classification Search ........... 24/279–282, 24/284–286, 19, 275, 276, 20 LS, 20 S, 274 R; 285/252, 253, 365–367, 407–411, 23
    See application file for complete search history.

(56) References Cited

U.S. PATENT DOCUMENTS 3,365,218 A * 1/1968 Denyes ....................... 285/253
3,407,448 A   10/1968 Tetzlaff et al.
3,454,996 A   7/1969 Tetzlaff et al.
3,477,106 A * 11/1969 Tetzlaff et al. ................ 24/279
4,483,556 A * 11/1984 LiVolsi ...................... 285/252

FOREIGN PATENT DOCUMENTS

| DE | 41 27 017    | 4/1992  |
|----|--------------|---------|
| DE | 42 35 325    | 3/1994  |
| DE | 102 49 474   | 5/2004  |
| DE | 103 04 514   | 8/2004  |
| DE | 102004006658 | 2/2005  |
| DE | 203 21 371   | 2/2007  |
| FR | 2 630 808    | 11/1989 |
| JP | 5087391      | 11/1993 |
| WO | 2004044474   | 5/2004  |

* cited by examiner

*Primary Examiner*—James R Brittain
(74) *Attorney, Agent, or Firm*—Lucas & Mercanti, LLP; Klaus P. Stoffel

(57) ABSTRACT

A hose clamp includes a clamping band, a tensioning device and a positioning arrangement for positioning the hose clamp on a hose. The positioning arrangement includes at least two positioners. The two positioners may be arranged at a distance from each other in a circumferential direction of at least 120°. Axial stops may be arranged on both sides in a circumferential direction of at least one of the positioners.

8 Claims, 1 Drawing Sheet

HOSE CLAMP

BACKGROUND OF THE INVENTION

1. Field of the Invention

The present invention relates to a hose clamp with a clamping band, a clamping device and a positioning arrangement for positioning the hose clamp on a hose.

2. Description of the Related Art

A hose clamp of this type is known, for example, from WO 2004/044474A1. The positioning arrangement includes a positioner which is attached to the clamping band or is integrally formed in one piece with the clamping band. The positioner has two claw-like protrusions which can be pressed into the circumferential wall of a hose.

A hose clamp has the primary purpose of fastening the end of a hose on a connection piece. The hose is pushed onto the connection piece and the hose clamp, which advantageously has already been mounted on the hose before the hose is pushed onto the connection piece, is tensioned by actuating the tensioning device. This procedure has to be repeated relatively frequently in the manufacture of an automobile.

Clamping of the hose clamp usually requires the use of a tool. It is advantageous in this connection if the clamping device is arranged in a certain position. In order to ensure this position, the positioning arrangement is provided which makes it possible to secure the hose clamp on the circumference of the hose in a predetermined angular position relative to the hose.

The use of such a positioning arrangement has already made it easier to some extent to fasten a hose on a connection piece. However, the actuation of the clamping device still requires a certain skill.

SUMMARY OF THE INVENTION

Therefore, it is the object of the present invention to simply the assembly of a hose.

In a hose clamp of the above-described type, the above object is met by providing the positioning arrangement with at least two positioners.

Using two positioners, it is not only possible to secure the angular position of the hose clamp and, thus, the position of the clamping device in the circumferential direction of the hose. It is also possible to adjust with greater certainty the angular position which is assumed by the clamping band relative to the circumferential direction of the hose. As a result, tilting of the hose clamp relative to the hose becomes less likely or is even avoided, so that an inaccurate tightening of the hose clamp can be prevented. The person who is mounting the hose with the hose clamp on the connection piece has to use less care in order to tighten the hose clamp in the desired manner. A non-uniform axial deformation of the material of the hose can be avoided or reduced.

In accordance with an advantageous feature, two positioners are spaced at a distance from each other in circumferential direction which is at least 120°. In the case of such an angular distance, the risk is relatively small that the clamping band tilts relative to the circumferential direction of the hose.

In accordance with a preferred feature, if at least one positioner is arranged, axial stops are provided on both sides of the positioner in the circumferential direction.

This makes it possible to reliably prevent tilting of the hose clamp relative to the circumferential direction of the hose in almost all directions.

In accordance with a preferred feature, none of the positioners is fastened fixedly in the circumferential direction and the at least one other positioner is movable relative to the clamping band in the circumferential direction. Thus, the hose clamp has a stationary positioner and a positioner which is mounted in a "floating manner". This makes it possible that the floating positioner can remain in the same location at the hose when the clamping band is tensioned, even if the inner diameter of the clamping band is reduces. To the extent that the internal diameter of the clamping band is reduced, the floating positioner travels relative to the clamping band.

In accordance with a preferred feature, the movable positioner is arranged on a sheet metal bridge which is arranged in the interior of the clamping band. The sheet metal bridge has several advantageous. First, the sheet metal bridge supports the positioner in the circumferential direction at two positions relative to the clamping band, so that tilting of the clamping band relative to the circumferential direction of the hose can be avoided even if the positioner is not yet arranged immediately at the clamping band. In addition, it can be ensured that the positioner can be mounted from the beginning at the correct location on the hose because the positioner may actually have a certain distance from the clamping band in the untensioned state.

In accordance with a preferred feature, the sheet metal bridge is constructed as a spring. This makes it easier to spread the hose clamp when the hose clamp is being disassembled.

The movable positioner is preferably formed integrally with the sheet metal bridge. This makes the manufacture simpler. For example, the positioner and the sheet metal bridge can be punched as a single piece. The sheet metal bridge is preferably arranged in an area of the clamping device. This makes it possible to use the sheet metal bridge for another purpose, namely for covering the material gap in the area of the clamping device. The two ends of the clamping band have to overlap, wherein the inner end of the clamping band is displaced on the circumferential surface of the hose when the clamping band is tensioned. If the sheet metal bridge is arranged in this area, the inner end is not displaced immediately on the material of the hose when the clamping band is tensioned, but rather the inner end can travel on the outer side of the sheet metal bridge. Accordingly, the danger that the hose is damaged by the tensioning procedure is very small.

Another advantage is the fact that the hose clamp has a nominal dimension and a distance between the sheet metal bridge and a diametrically oppositely located section of the clamping band is smaller than the nominal dimension. This feature makes it possible that the hose clamp is already in the untensioned state of the clamping device placed on the circumference of the hose with a certain pretension. Accordingly, the hose is clamped between the sheet metal bridge and the diametrically oppositely located section of the clamping band. The clamping forces to be used for this procedure do not have to be large. They only have to be sufficient for achieving a prepositioning of the clamp.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 2:
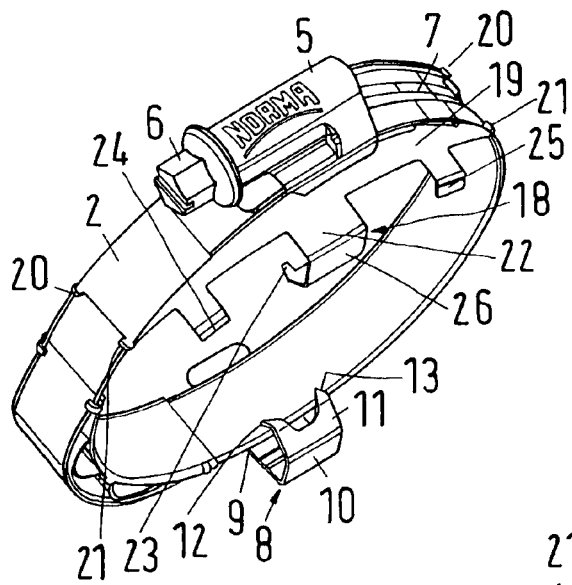
FIG. 2 is a perspective view of a hose clamp.
Figure 1:
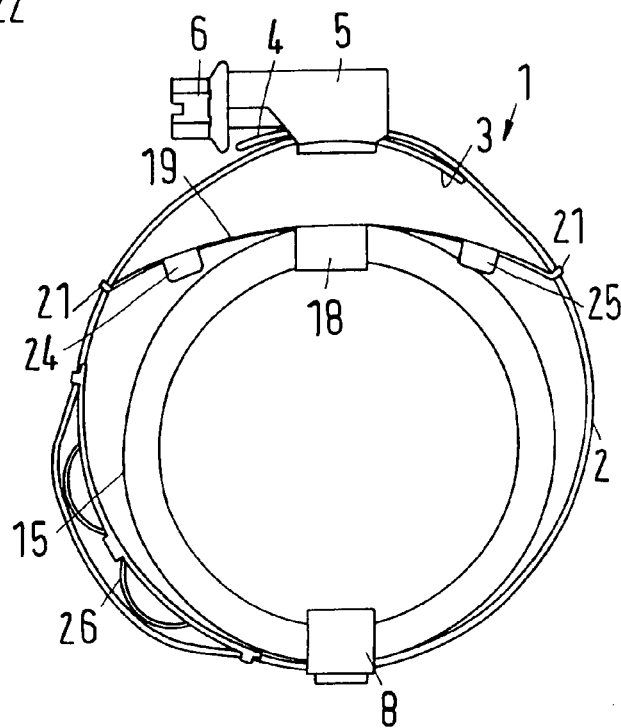
FIG. 1 is a front elevational view of a hose clamp.

The hose clamp 1 shown in the drawings includes a clamping band 2 whose ends are placed one on top of the other in such a way that there is an inner end 3 and an outer end 4. The two ends 3, 4 are connected to each other through a clamping device 5. The clamping device 5 is fixedly connected to the inner end 3 of the clamping band and includes a clamping screw 6 which is in engagement with a threaded embossment 7 on the outer side of the outer end 4 of the clamping band. By rotating the tightening screw, the outer end 4 is displaced in the circumferential direction relative to the inner end 3 of the clamping band 2.

Diametrically oppositely arranged of the clamping device 5 is a first positioner 8 which is connected fixedly to the clamping band 2. The positioner may be welded or glued to the clamping band 2, or may be connected by clinching or embossing the clamping band 2. It is also possible to construct the first positioner 8 in a single piece with the clamping band 2.

Figure 3:
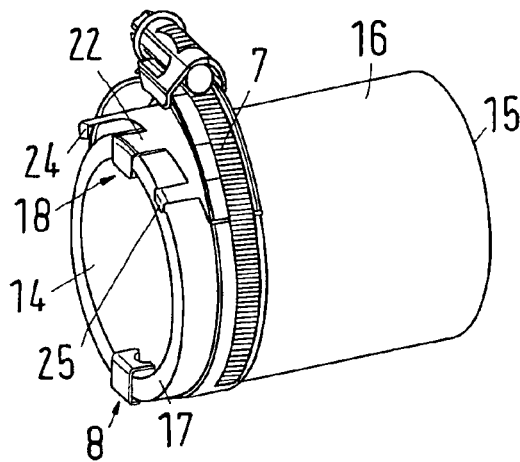
FIG. 3 is a perspective view showing the hose clamp mounted on a hose.
Figure 4:
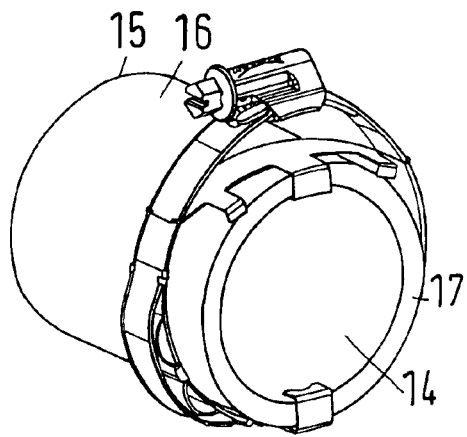
FIG. 4 is a perspective view of the hose clamp mounted on the hose shown from different angle.

As can be seen particularly from FIGS. 2 to 4, the first positioner 8 has a fastening section 9 extending transversely of the circumferential direction of the clamping band 2, wherein the fasting section 9 protrudes in axial direction of the clamping band 2 by a certain distance beyond the clamping band 2. The fastening section 9 is bent at the protruding end into a U-shape, so that a base 10 and a leg 11 are formed. The leg 11 has two tips 12, 13 which can dig somewhat into the inner wall 14 of a hose 15 on a circumferential wall 16 the hose clamp is mounted. The protrusion of the fastening section 9 defines an axial distance which is assumed by the hose clamp 1 relative to the end face 17 of the hose 15.

A second positioner 18 is arranged diametrically opposite the first positioner 8. The second positioner 18 is constructed in one piece with a sheet metal bridge 19 which is mounted on the clamping band 2 in a floating manner. In other words, the sheet metal bridge 19 has at both its ends a pair of bent lugs 20, 21 which engage around the clamping band 2 in such a way that the sheet metal bridge 19 can be displaced relative to the clamping band 2. The sheet metal bridge is manufactured of a resilient material, preferably of spring steel. The sheet metal bridge is arranged relative to a diametrically oppositely located section of the clamping band 2 in such a way the sheet metal bridge is located at the distance from a section where the first positioner 8 is arranged, wherein this distance is smaller than the diameter of the hose 15 on which the hose clamp 1 is to be mounted. In the untensioned state, the sheet metal bridge 19 is then already slightly bent outwardly, so that the sheet metal bridge 19 rests in the area of the second position 18 with a certain tension against the circumference of the hose 15.

The sheet metal bridge 19 has an axial protrusion 22 whose axial length corresponds proximately to the length of the protrusion of the fastening section 9 of the first positioner. The second positioner 18 is bent in a U-shape at the axial end of the projection 22, so that once again two tips 23 are formed which can claw into the inner wall 14 of the hose 15. Of the two tips 23, only one is visible in FIG. 2.

The sheet metal bridge 19 has in circumferential direction on both sides of the second positioner 18 an axial stop 24, 25 which interacts with the end face 17 of the hose 15 when the hose clamp 1 is mounted. The two axial stops 24, 25 are arranged in axial direction at the same distance from the sheet metal bridge 19 as the base 26 of the U of the second positioner 18. Arranged in the same axial position is also the base 10 of the first positioner 8, so that, when the hose clamp body is pushed onto the circumference of the hose 15, the hose clamp 1 can be supported such that altogether four positions at the end fan 17 of the hose 15. This effectively prevents tilting of the hose clamp 1 relative to the circumferential direction of the hose 15.

The tips 12, 13 and 23 simultaneously prevent rotation of the hose clamp 1 on the circumference of the hose 15, so that the preassembled hose clamp 1 remains in the position it has once assumed until the hose clamp 1 is tightened on the hose 15.

The spring or sheet metal bridge 19 is arranged in circumferential direction in that area where the tensioning device 5 is also located. During tensioning, the inner end 3 of the clamping band 2 moves relative to the outer end 4. This movement is kept away from the circumferential wall 16 of the hose 15 because the inner end 3 slides on the outer surface of the sheet metal bridge 19 when the hose clamp 19 is tensioned.

A movement of the two ends 3, 4 of the clamping band 2 is possible even though the second position 18 is present because the sheet metal bridge 19 is mounted in a floating manner on the clamping band 2. Accordingly, the clamping band 2 can move relative to the sheet metal bridge 19.

Additionally arranged at the inner side of the clamping band 2 is a spring device 26 which tensions the hose clamp even when the tensioning force of the hose clamp 1 would otherwise be diminished in the case of a thermally caused diameter change. Such a spring arrangement is already known from DE 41 27 017 C1. diameter change. Such a spring arrangement is already known from DE 41 27 017 C1.

When the hose clamp 1 is tensioned, the sheet metal bridge 19 places itself around the circumference of the hose 15. Since the sheet metal bridge 19 is made of a resilient material, it reinforces the spreading of the clamping band 2 when the clamping device is released, so that the disassembly of the hose 15 from a connection piece is facilitated.

Two positioners 8 and 18 are illustrated with tips 12, 13 or 23. Of course, it is also possible to use positioners of different types.

While specific embodiments of the invention have been shown and described in detail to illustrate the inventive principles, it will be understood that the invention may be embodied otherwise without departing from such principles.

We claim:

1. A hose clamp comprising a clamping band, a tensioning device and a positioning arrangement for positioning the hose clamp on a hose, wherein the positioning arrangement comprises at least two positioners, wherein one of the positioners is mounted fixedly in circumferential direction on the clamping band, and the at least one additional positioner is movable in circumferential direction of the clamping band, wherein the movable positioner is arranged on a sheet metal bridge arranged in an interior of the clamping band.

2. The hose clamp according to claim 1, wherein the at least two positioners are arranged at a distance from each other in circumferential direction of at least 120°.

3. The hose clamp according to claim 1, wherein axial stops are arranged on both sides in circumferential direction of at least one of the positioners.

4. The hose clamp according to claim 1, wherein the sheet metal bridge is comprised of a spring.

5. The hose clamp according to claim 1, wherein the movable positioner is constructed integrally with the sheet metal bridge.

6. The hose clamp according to claim 1, wherein the sheet metal bridge is arranged in an area of the clamping device.

7. The hose clamp according to claim 1, wherein the hose clamp has a nominal dimension, and wherein a distance exists between the sheet metal bridge and a diametrically oppositely located section of the clamping band, wherein the distance is more than the nominal dimension.

8. The hose clamp according to claim 1, wherein a spring device is mounted on an inner side of the clamping band.

* * * * *